United States Patent [19]

Nogi et al.

[11] Patent Number: 5,043,377
[45] Date of Patent: Aug. 27, 1991

[54] GRANITE-LIKE ARTIFICIAL STONE

[75] Inventors: Kozo Nogi; Chihiro Tani, both of Osaka; Nobuhiko Yukawa, Akashi; Terukuni Hashimoto, Itami, all of Japan

[73] Assignee: Nippon Shokubai Kagaku Kogyo Company, Ltd., Osaka, Japan

[21] Appl. No.: 414,265

[22] Filed: Sep. 29, 1989

[30] Foreign Application Priority Data

Oct. 7, 1988 [JP] Japan .................................. 63-251891
Nov. 4, 1988 [JP] Japan .................................. 63-277271

[51] Int. Cl.$^5$ .................................................. C08K 3/22
[52] U.S. Cl. ........................................ 524/437; 524/522; 524/523; 524/533
[58] Field of Search .................. 524/437, 523, 525, 533

[56] References Cited

U.S. PATENT DOCUMENTS

| | | | |
|---|---|---|---|
| 4,085,246 | 4/1978 | Buser et al. | 524/437 |
| 4,159,301 | 6/1979 | Buser et al. | 264/331 |
| 4,183,991 | 1/1980 | Smiley et al. | 524/437 |
| 4,734,452 | 3/1988 | Hashimoto et al. | 524/533 |

FOREIGN PATENT DOCUMENTS 318325 of 0000 European Pat. Off. .

*Primary Examiner*—Joseph L. Schofer
*Assistant Examiner*—R. H. Delmendo
*Attorney, Agent, or Firm*—Oblon, Spivak, McClelland, Maier & Neustadt, P.C.

[57] ABSTRACT

Disclosed herein is granite-like artificial stone which comprises a matrix and chips dispersed therein, said matrix being a cured product of specific radical-polymerizable monomers and an inorganic filler powder, and said chips being a cured product of a mixture (II) which contains the components identical or similar to those in the mixture (I) but giving a different clarity and/or color tone from the cured product of the mixture (I). The artificial stone gives the appearance of granite and is superior in fabricability, heat resistance, hot water resistance, weather resistance, yellowing resistance, and stain resistance.

12 Claims, No Drawings

GRANITE-LIKE ARTIFICIAL STONE

BACKGROUND OF THE INVENTION

1. Field of the Invention

The present invention relates to granite-like artificial stone superior in fabricability, heat resistance, hot water resistance, weather resistance, yellowing resistance, and stain resistance. This artificial stone will find use as a raw material for house furnishings (e.g., bathtub, kitchen counter, and washstand) and interior and exterior decorative walls of buildings.

2. Description of the Prior Art

Artificial stone is well known which is composed of chips or fragments of natural stone embedded in a matrix of unsaturated polyester resin or acrylic resin which is produced by radical polymerization. There is another type of artificial stone which gives the appearance of natural stone on account of the transparent gelcoat (surface layer) covering inside stone chips.

These conventional artificial stones have a disadvantage that the chips of natural stone for decoration do not disperse uniformly but settle easily in the matrix (uncured liquid resin) because of the great difference in specific gravity and that it cannot be given a desired design pattern with transparency and color tone in varied degrees. They also have another disadvantage that the chips of natural stone are liable to interfacial slipping off on account of insufficient adhesion between chips and resin and that they are not necessarily good in strength, durability, and stain resistance. They have an additional disadvantage that they can be fabricated only with the same cutting and grinding tools as used for natural stone and hence their fabrication has to be left to a specialist.

In order to eliminate these disadvantages, there was proposed a new kind of artificial stone in which chips of natural stone are replaced by resin particles obtained by crushing a thermoplastic resin (e.g., acrylic resin) or a cured product of unsaturated polyester resin. (See Japanese Patent Laid-open No. 31134/1984.)

Unfortunately, the artificial stone made with thermoplastic resin particles has a disadvantage that it provides moldings lacking stable quality because the particles are swollen or dissolved by the uncured resin liquid or polymerizable monomer during the molding process and this changes the viscosity and color of the mixture. In addition, the artificial stone of this kind provides moldings which are subject to softening and deforming by heat even at a comparatively low temperature, and scratching and are also liable to discoloration and frosting by cosmetics on account of its poor solvent resistance. Moreover, the artificial stone of this kind is not suitable for bathtubs and washbowls because it whitens and becomes opaque in a short time when it is in contact with hot water.

By contrast, the artificial stone made with particles of cured product of unsaturated polyester resin has improved processability, design freedom, heat resistance, and solvent resistance; yet it is still poor in weather resistance, stain resistance, and heat discoloration (yellowing) resistance, and hot water resistance (resistance to whitening and frosting by hot water).

On the other hand, the above-mentioned artificial stone is based on a matrix resin which is a radical polymerization resin (e.g., an unsaturated polyester resin or an acrylic resin) incorporated with a filler. These matrix resins are poor in heat resistance and weather resistance and are subject to shrinkage at the time of cure. This shrinkage causes cracking and makes demolding difficult in the case of three-dimensional molding.

There has been proposed a method for reducing the shrinkage of matrix resin which takes place at the time of cure. According to this method, the matrix is made from a resin mixture of a radical polymerization resin and a thermoplastic resin, and the latter is subjected to phase separation or foaming at the time of cure. This method, however, has a disadvantage that the resulting cured product is cloudy and opaque (which makes the resulting artificial stone look poor) and is poor in stain resistance.

SUMMARY OF THE INVENTION

It is an object of the present invention to provide a new kind of artificial stone which gives the appearance of natural granite and has superior fabricability, heat resistance, hot water resistance (resistance to whitening and frosting by hot water), weather resistance, heat discoloration resistance, solvent resistance, and stain resistance.

It is another object of the present invention to provide high-quality granite-like artificial stone which can be easily fabricated into complex shapes free of cracking and other flaws.

Other and further objects, features, and advantages of the invention will appear more fully from the following description.

DETAILED DESCRIPTION OF THE INVENTION

The gist of the present invention resides in granite-like artificial stone which comprises a matrix and chips dispersed therein, said matrix being a cured product of a mixture (I) composed essentially of specific radical-polymerizable monomers (containing a polyfunctional (meth)acrylate and an aromatic vinyl compound) and an inorganic filler powder, and said chips being a cured product of a mixture (II) composed essentially of specific radical-polymerizable monomers identical to or different from said radical-polymerizable monomers and an inorganic filler powder, and giving a different clarity and color tone from said matrix.

The following is the detailed description of the granite-like artificial stone pertaining to the present invention. The description will be given separately of the matrix and the chips dispersed therein which constitute the artificial stone.

There are two kinds of matrices with which the artificial stone of the present invention is made. The first matrix (M-a) is a cured product of a mixture (I-a) composed essentially of radical-polymerizable monomers (A) (containing a polyfunctional (meth)acrylate and an aromatic vinyl compound) and an inorganic filler powder (B). The second matrix (M-b) is a cured product of a mixture (I-b) composed essentially of said radical-polymerizable monomers (A), an inorganic filler powder (B), a thermoplastic resin(C) soluble or dispersible in said radical-polymerizable monomers (A), an epoxy resin (D) soluble or dispersible in said radical-polymerizable monomers (A), and a polyfunctional carboxylic acid and/or anhydride thereof (E).

The matrix (M-a) is made with radical-polymerizable monomers (A) which contain a polyfunctional (meth)acrylate and an aromatic vinyl compound as essential components. The polyfunctional (meth)acrylate denotes those compounds which contain two or more (meth)acryloyl groups in one molecule. They include, for example, ethylene glycol di(meth)acrylate, propylene glycol di(meth)acrylate, neopentyl glycol di(meth-)acrylate, glycerin tri(meth)acrylate, trimethylolpropane tri(meth)acrylate, dipentaerythri tol hexa(meth)acrylate, and bisphenol-A di(meth)acrylate. Preferable among them are aliphatic polyfunctional (meth)acrylates. These polyfunctional (meth)acrylates may be used alone or in combination with one another.

The aromatic vinyl compound includes, for example, styrene, α-methylstyrene, p-methylstyrene, and divinylbenzene. They may be used alone or in combination with one another.

The polyfunctional (meth)acrylate and aromatic vinyl compound should be mixed at a proper ratio so that the former accounts for 20–80 wt% and the latter, 80–20 wt% in the matrix. (As the amount of the latter increases, the resulting cured product has a higher clarity; but it has an upper limit for the desired property of the matrix.)

The radical-polymerizable monomers (A) for the matrix (M-a) should be composed of the above-mentioned two kinds of monomers as essential components, and they may also contain other radical-polymerizable monomers and small amounts of oligomers enumerated below. (Meth)acrylate esters (e.g., methyl (meth)acrylate and isobutyl (meth)acrylate), macromonomers, unsaturated polyester oligomers, fumarate esters, and maleimides.

The inorganic filler powder (B) as an essential component constituting the matrix (M-a) may be selected from any inorganic powders which are commonly used as fillers in the industry. Preferred examples include calcium carbonate, talc, clay, silica, alumina, quartz, calcium silicate, and metal hydroxide and metal oxide hydrate (such as aluminum hydroxide, magnesium hydroxide, and calcium hydroxide).

Among the inorganic filler powders (B) listed above, metal oxide hydrates (metal hydroxides) are preferable because they provide a beautiful matrix (M-a) having flame retardance and clarity. The one having a whiteness higher than 90% is desirable. Aluminum hydroxide (including aluminum oxide hydrate) is most desirable. Incidentally, the metal hydroxide may be partly replaced by other inorganic filler powder such as silica, alumina, quartz, calcium silicate, talc, and clay.

The inorganic filler powder (B) should be used in an amount of 100–800 parts by weight for 100 parts by weight of the radical-polymerizable monomers (A). The inorganic filler powder (B) may be one which has previously been treated with a silane coupling agent, or may be incorporated into the above-mentioned mixture (I-a) in which a silane coupling agent has been dissolved or dispersed in an amount of 0.1–2.0% (based on the weight of the inorganic filler powder (B)). The silane coupling agent improves the water resistance of the resulting product. The inorganic filler powder (B) may be used in combination with a variety of coloring agents to impart a desired color to the product. Incidentally, the inorganic filler powder (B) should preferably have an average particle diameter smaller than 5 μm.

The mixture (I-a) for the matrix (M-a) is composed of the radical-polymerizable monomers (A) and inorganic filler powder (B) as mentioned above. If necessary, however, he mixture (I-a) may be incorporated with a small amount of a thermoplastic resin (C) to prevent cracking and to improve the surface smoothness of the product. This thermoplastic resin (C) may be well-known ones such as (meth)acrylate polymer, (meth)acrylate esterstyrene copolymer, polystyrene, vinyl acetate, styrenevinyl acetate copolymer, polyvinyl chloride, polybutadiene, polyethylene, polycaprolactam, and saturated polyester. They may be used alone or in combination with one another. Particularly preferable among them are polystyrene and polymethyl methacrylate. Incidentally, these thermoplastic resins (C) may have one or more functional groups such as epoxy group, thioepoxy group, aziridine group, oxazoline group, and N-hydroxyalkylamide group in the molecule. These thermoplastic resins (C) should be used in an amount less than 40 parts by weight, preferably from 5 to 30 parts by weight, in the mixture (I-a). When used in large amounts, they make the mixture (I-a) too viscous for casting and deteriorate the clarity and heat resistance of the product.

The above-mentioned mixture (I-a) should be cured with a curing agent selected from radical polymerization initiators such as benzoyl peroxide, cyclohexanone peroxide, methyl ethyl ketone peroxide, bis(4-t-butylcyclohexyl) peroxydicarbonate, t-butyl peroxybenzoate, and t-butyl peroxyoctoate. These curing agents may be used alone or in combination with one another. They may also be used in combination with an accelerator such as organic amine and polyvalent metal salt.

The matrix (M-b) is composed of radical-polymerizable monomers (A), inorganic filler powder (B), and thermoplastic resin (C) which are the same as those used as raw materials for the above-mentioned matrix (M-a).

The above-mentioned thermoplastic resin (C) may be one which is soluble or dispersible in the radical-polymerizable monomers (A) and has a functional group reactive with the epoxy resin (D) or polyfunctional carboxylic acid and/or anhydride thereof (E) explained below. Examples of the thermoplastic resin having a functional group include those which have in the molecule one or more functional groups selected from epoxy group, thioepoxy group, aziridine group, oxazoline group, and N-hydroxyalkylamide group.

The functional group-containing thermoplastic resin (C) may be produced by:

(1) polymerizing a polymerizable monomer having in the molecule a reactive group such as epoxy group, thioepoxy group, aziridine group, oxazoline group, and N-hydroxyalkylamide group, with other polymerizable monomers according to need.

(2) reacting a compound having the above-mentioned reactive group in the molecule with a polymer having a group reactive with said compound, thereby introducing said reactive group into said polymer.

(3) converting a polymer having in the molecule a functional group not reactive with the epoxy resin (D) or the polyfunctional carboxylic acid/or anhydride thereof, into a polymer having in the molecule the above-mentioned reactive group by any known method. The thermoplastic resin (C) specified above contributes to the mixture (I-b) which does not become cloudy when cured but provides a cured product having a good appearance.

The thermoplastic resin (C) should be contained in the mixture (I-b) in such an amount that the mixture does not become cloudy or opaque on account of foaming or phase separation at the time of curing. An adequate content should be established in consideration of the miscibility of the thermoplastic resin (C) and the radical-polymerizable monomers (A). It is in the range of 5 to 75 parts by weight for 100 parts by weight of the radical-polymerizable monomers (A). If the amount of the thermoplastic resin (C) is less than 5 parts by weight, the resulting mixture (I-b) undergoes great shrinkage when cured and hence the matrix (M-b) is subject to cracking. With an amount in excess of 75 parts by weight, the resulting matrix (M-b) becomes cloudy and opaque (impairing the appearance of the granite-like artificial stone) and is somewhat poor in heat resistance.

The mixture (I-b) for the matrix (M-b) contains the epoxy resin (D), which is a compound having two or more epoxy groups in one molecule and a molecular weight higher than 150. It includes, for example, bisphenol-A epoxy resin, bisphenol-F epoxy resin, novolak epoxy resin, and alicyclic epoxy resin. They may be used alone or in combination with one another.

The epoxy resin (D) may be used in combination with a reactive diluent such as n-butyl glycidyl ether, allyl glycidyl ether, phenyl glycidyl ether, and vinyl cyclohexene monoepoxide.

The epoxy resin (D) should be used in an amount of 10 to 100 parts by weight for 100 parts by weight of the radical-polymerizable monomers (A). If the amount of the epoxy resin (D) is less than 10 parts by weight, the resulting resin composition suffers great shrinkage at the time of curing. On the other hand, with an amount in excess of 100 parts by weight, the mixture (I-b) is slow in curing and hence takes a long time before demolding.

The polyfunctional carboxylic acid and/or anhydride thereof (E) (referred to as simply carboxylic acid compound (E) occasionally hereinafter) is a compound having two or more carboxyl groups in the molecule and/or an anhydride thereof, and it works as a hardener for the epoxy resin (D). The carboxylic acid compound (E) includes, for example, maleic acid, phthalic acid, trimellitic acid, pyromellitic acid, tetrahydrophthalic acid, and adipic acid, and anhydrides thereof. It may be replaced by a carboxyl group-containing polymer such as poly(meth)acrylic acid.

The carboxylic acid compound (E) should preferably be used in an amount of 0.5 to 4.0 equivalents for 1 equivalent of the epoxy resin (D). (Acid anhydrides should be regarded to be difunctional.) If the amount of the carboxylic acid compound (E) is less than 0.5 equivalent, the resulting cured product is subject to cracking and is poor in heat resistance. Conversely, with an amount in excess of 4.0 equivalents, the cured product is poor in water resistance and weather resistance.

Incidentally, in the case where the thermoplastic resin (C) contains two or more carboxyl groups reactive with the epoxy resin (D), these carboxyl groups should be added to the equivalent of the carboxylic acid compound (E).

The reaction of the carboxylic acid compound (E) with the epoxy resin (D) may be accelerated by the addition of a small amount of accelerator such as tertiary amine, ester of boric acid, Lowis acid and organometallic compound.

The matrix (M-b) should contain the inorganic filler powder (B) in an amount of 100 to 800 parts by weight for 100 parts by weight of the radical-polymerizable monomers (A). If the amount of the inorganic filler powder (B) is less than 100 parts by weight, the resulting cured product is somewhat poor in heat resistance and lacks the depth of granite. Conversely, with an amount in excess of 800 parts by weight, the resin composition is too viscous for molding and curing operations.

The mixture (I-b) for the matrix (M-b) may be incorporated with, in addition to the above-mentioned components, the same hardener and accelerator as added to the mixture (I-a) for the matrix (M-a).

The matrix (M-a) and matrix (M-b) (collectively referred to as matrix (M) hereinafter) contains chips (K) dispersed therein. The chips (K) are produced by crushing at least one kind of cured product of the mixture (II) composed of radical-polymerizable monomers (A') and inorganic filler powder (B') and an optional coloring agent. The radical-polymerizable monomers (A') are composed of polyfunctional (meth)acrylate and aromatic vinyl compound which are the same as or different from those used as the constituents of the matrix (M). The inorganic filler powder (B') is one which is the same as or different from that used as the constituent of the matrix (M). Examples of the polyfunctional (meth)acrylate and aromatic vinyl compound contained in the radical-polymerizable monomers (A') are the same as those of the polyfunctional (meth)acrylate and aromatic vinyl compound contained in the radical-polymerizable monomers (A) for the matrix (M).

The chips (K) are produced in the following manner. First, a mixture is prepared from 100 parts by weight of radical-polymerizable monomers (A') composed of 80-20 wt% of polyfunctional (meth)acrylate and 20-80 wt% of aromatic vinyl compound and 100-800 parts by weight of inorganic filler powder (B'). The inorganic filler powder (B,) may be one which has previously been treated with a silane coupling agent, or may be incorporated into the radical-polymerizable monomers (A') in which a silane coupling agent has been dissolved or dispersed in an amount of 0.1-2.0% (based on the weight of the inorganic filler powder (B')). The silane coupling agent improves the water resistance of the resulting product. The inorganic filler powder (B') may also be used in combination with a variety of coloring agents to impart a desired color to the product.

The mixture (II) as the raw material of the chips (K) may contain, in addition to the above-mentioned radical-polymerizable monomers (A') and inorganic filler powder (B'), thermoplastic resin, reinforcing fiber (e.g., glass fiber), mold release agent(e.g., zink stearate), thixotropic agent, plasticizer, flame retardant, and flameproofing agent. The mixture (II) is usually incorporated with a radical polymerization initiator as a hardening agent in an amount of 0.5-3.0% based on the weight of the radical-polymerizable monomers (A').

Secondly, the thus prepared mixture (II) is uniformly mixed by using a high-speed mixer, pigment dispersing machine for paint production, mixing roll, or kneader. The mixture is molded by casting, pressing, extrusion or the like, and then cured. Casting is the most common procedure. Casting is followed by curing which may be accomplished in two stages, i.e., precuring at about 60° C. and post curing at 80°-10° C.

The cured product for the chips (K) may be clear or opaque with different colors depending on the raw materials used. It is necessary that it should differ in clarity and color from the cured product of the mixture (I) which constitutes the matrix. If they are similar to each other, the resulting chips (K) will not provide the desired granite-like artificial stone.

The cured product for the chips (K) should have a light transmittance lower than that of the cured product constituting the matrix. To be concrete, the light transmission for a 0.3 mm thick specimen should be higher than 2%, preferably 2-70%, and more desirably 5-65%. This requirement should be met to provide granite-like artificial stone having depth and superior design freedom. If the cured product (K) is nearly opaque with a light transmittance lower than 2%, it does not provide chips for artificial stone which gives the appearance with depth.

Thirdly, the cured product (K) is crushed by using a hammer mill or crusher in the usual way.

The chips (K) should have an adequate particle size according to the granite pattern required. A preferred particle size is 10 to 100 mesh (ASTM standard sieve). Coarse particles larger than 10 mesh and fine particles smaller than 100 mesh will not produce the granite pattern clearly and reproducibly in the product.

The chips (K) may be obtained from one kind of resin; but they are likely to produce a rather flat granite pattern. Therefore, it is desirable to use chips obtained from at least two kinds of cured products which differ in clarity and/or color.

The thus obtained chips (K) are mixed in an amount of 40-150 parts by weight, preferably 50-100 parts by weight, with 100 parts by weight of the mixture (I) for the matrix, and the resulting mixture (III) is molded and cured to give the desired granite-like artificial stone of the present invention. If the amount of the chips (K) is less or more than specified above, the resulting artificial stone will not give the appearance of natural granite.

It is necessary that the mixture (I) for the matrix (M) should have a light transmittance higher than 60% (measured for a 0.3 mm thick specimen prepared by curing the mixture (I)), so that the chips (K) dispersed in the matrix (M) look three-dimensional. It is also necessary that the chips (K) and the cured product of the mixture (I) should be close to each other in specific gravity (with a difference smaller than ±0.1), so that the chips (K) are uniformly dispersed in the matrix (M).

The chips (K) are dispersed into the mixture (I) to give the low-viscosity mixture (III) suitable for casting or the high-viscosity mixture (III) like dough suitable for press-molding. Dispersion for the first case may be accomplished by using a high-speed mixer, pigment dispersing machine for paint production, or mixing roll. Dispersion for the second case may be accomplished by using a low-speed powerful mixer such as kneader.

The resulting mixture (III) composed of the mixture (I) and the chips (K) dispersed therein is molded by casting, pressing, extrusion, or the like, and then cured. Thus there is obtained granite-like artificial stone. It is finished by surface polishing or sanding.

There are no limitations on the method of molding and curing the mixture (III). A preferred method is shown below for the mixture (III) containing the matrix mixture (I-b) of epoxy resin.

First, a mold is made ready by applying a mold release agent, if necessary. Any casting mold commonly used for unsaturated polyester resin or radical-polymerizable syrup will do. The mold may be made of FRP, wood, or aluminum. A mold capable of temperature control is desirable to control the curing reaction and increase the productivity.

Secondly, the mixture (III) composed of the mixture (I) and chips (K) is incorporated with a radical polymerization initiator and, if necessary, a polymerization accelerator. Their kind and amount should be determined in consideration of the pot life (from the addition of the initiator to the completion of casting) and the curing time (from casting to demolding). The radical polymerization initiator and polymerization accelerator are the same as those used for curing the ordinary unsaturated polyester resin and radical-polymerizable syrup.

The radical polymerization initiator includes those examples as mentioned earlier. A preferred one should have a 10-hour half-life temperature higher than 50° C. so that it gives a sufficient pot life to the molding resin compound. If this requirement is not met, the molding resin compound has a short pot life, which leads to poor workability. However, this requirement is not a must in the case where casting is carried out by adding the radical polymerization initiator continuously using a line mixer or the like.

Examples of the radical polymerization initiator having a 10-hour half-life temperature higher than 50° C. include methyl ethyl ketone peroxide, methyl isobutyl ketone peroxide, lauroyl peroxide, benzoyl peroxide, t-butyl peroxypivalate, t-butyl peroxy-2-ethylhexanoate, and t-butyl peroxyisobutyrate.

The radical polymerization initiator should be used in an amount of 0.1-10.0 parts by weight, preferably 0.2-5 0 parts by weight, for 100 parts by weight of the total amount of the radical-polymerizable monomers (A) and thermoplastic resin (C) in the mixture (I) for the matrix. If the amount of the polymerization initiator is less than 0.1 part by weight, the radical polymerization is slow and hence it takes a long time before demolding. Conversely, if it is in excess of 10.0 parts by weight, the radical polymerization proceeds so rapidly that the molding is subject to cracking at thick-walled parts or yellowing.

It is desirable to carry out the radical polymerization by using the polymerization initiator alone without the polymerization accelerator. In this case, the resulting granite-like artificial stone is less subject to discoloration and is superior in weather resistance and heat discoloration resistance.

The thus obtained mixture (III) containing the radical polymerization initiator is subsequently cast into the above-mentioned mold at normal temperature or with heating. The radical polymerization reaction should preferably be carried out by heating the mold to 40° C. or above according to the 10-hour half-life temperature of the radical polymerization initiator used.

The heating of the mold may be accomplished by placing the mold in a heating furnace or by circulating a heating medium in the mold.

The mixture (III) is held in the mold until it cures by the radical polymerization reaction to such an extent that it is hard enough for demolding.

Reactions in the mold should be carried out such that the radical polymerization reaction proceeds in preference to the reaction between the epoxy resin (D) and the carboxylic acid compound (E) until the semicured product is demolded. In this situation, the uncured epoxy resin (D) functions as a plasticizer which relieves the internal stress caused by the cure shrinkage which occurs as the radical polymerization reaction proceeds. As the result, it prevents cracking which is liable to occur during curing in the mold.

To carry out the reactions as mentioned above, it is desirable to keep the mold temperature below 120° C. so that the radical polymerization reaction proceeds but the reaction between the epoxy resin (D) and the carboxylic acid compound (E) does not proceed. For the polymerization reaction to proceed efficiently at this temperature, it is desirable to use a polymerization initiator which has a 10-hour half-life temperature lower than 110° C.

When the radical polymerization reaction has proceeded sufficiently and the mixture (III) has cured, the cured product is demolded. Usually, it is very difficult to perform demolding in the semicured state by controlling the radical polymerization reaction. This is because the radical polymerization is fast and is accelerated by the reaction heat. However, the above-mentioned method permits easy control because the mixture retains its semicured state when the radical polymerization reaction has completed as a whole.

After demolding, the semicured molding is heated at 120°-200° C., if necessary, using a special tool which prevents deformation. This post-curing is necessary because it contains low-molecular weight epoxy resins (D) and carboxylic acid compounds (E) and hence it is subject to creep under sustained stress. This post-curing cures the epoxy resin (D) completely so that the resulting artificial stone has a sufficient hardness.

The thus obtained artificial stone is cut and polished according to need before being put to use.

The granite-like artificial stone of the present invention which is produced as mentioned above has good flame retardance, good resistance to whitening and yellowing after dipping in boiling water for a long time, and a high heat distortion temperature. In addition, it also has good resistance to a live cigarette placed thereon and good stain resistance. Thus, it will find use in the application area such as bathtub and kitchen counter in which the conventional artificial stone was not used on account of insufficient heat resistance and hot water resistance.

The granite-like artificial stone of the present invention is free of flaws such as cracking concomitant with shrinkage which occurs at the time of molding and curing. Therefore, it can be made into any item of complex three-dimensional shape having high strength. In addition, it has a very good appearance because it is free of foaming and phase separation which otherwise occur at the time of molding and curing.

EXAMPLES

The invention will be explained in more detail with reference to the following examples, which are not intended to restrict the scope of the invention.

Preparation of resin chips (K)

Manufacturing Example 1

First, a monomer mixture was prepared from 25 parts by weight of trimethylolpropane trimethacrylate, 75 parts by weight of styrene, and 0.5 parts by weight of silane coupling agent ("KBM-503" made by Shinetsu Chemical Co., Ltd.). The monomer mixture was incorporated with 200 parts by weight of aluminum hydroxide ("Hydilite H-320" having an average particle diameter of 3.5 μm, made by Showa Light Metal Co., Ltd.) using a high-speed mixer. The mixture was further incorporated with 1.5 parts by weight of white toner for acrylic resin ("AT-3" made by Dainichi Seika Kogyo Co., Ltd.) and 0.8 parts by weight of curing agent, bis(t-butylcyclohexyl)peroxy dicarbonate, ("Parcadox PX-16" made by Nippon Kayaku Co., Ltd.). After degassing under reduced pressure, there was obtained the mixture (II) for the chips.

Secondly, the mixture (II) was poured into a casting mold measuring 200×200×50 mm, followed by curing with heating at 70° C. for 30 minutes and post-curing at 120° C. for 2 hours. The resulting cured product was a marble-like translucent resin which scatters milky-white beautiful rays of light. It has a light transmittance of 62% measured for a 0.3 mm thick specimen.

Thirdly, the cured resin was crushed by a hammer mill. The crushed powder was screened through ASTM standard sieves to remove coarse particles larger than 20 mesh and fine particles smaller than 80 mesh. Thus there were obtained the chips (K-1) having a particle diameter of 20-80 mesh and a specific gravity of 1.75.

Manufacturing Example 2

The same procedure as in Manufacturing Example 1 was repeated to give the mixture (II) for chips, except that the monomer mixture was prepared from 25 parts by weight of trimethylolpropane trimethacrylate, 30 parts by weight of methyl methacrylate, and 45 parts by weight of styrene. The mixture (II) was cured to give a milky-white translucent cured resin which has a light transmittance of 48% measured for a 0.3 mm thick specimen. This resin was crushed and classified in the same manner as in Manufacturing Example 1 to give the chips (K-2) having a specific gravity of 1.75.

Manufacturing Example 3

The same procedure as in Manufacturing Example 2 was repeated to give the mixture (II) for chips, except that the monomer mixture was incorporated with 2.4 parts by weight of black toner for acrylic resin ("AT-845" made by Dainichi Seika Kogyo Co., Ltd.). The mixture (II) was cured to give a black, translucent cured resin which has a light transmittance of 16% measured for a 0.3 mm thick specimen. This resin was crushed and classified in the same manner as in Manufacturing Example 1 to give the chips (K-3) having a specific gravity of 1.75.

Manufacturing Example 4

The same procedure as in Manufacturing Example 1 was repeated to give a milky-white translucent cured resin, except that the monomer mixture was replaced by an unsaturated polyester resin. This resin had a light transmittance of 65% measured for a 0.3 mm thick specimen. This resin was crushed and classified in the same manner as in Manufacturing Example 1 to give the chips (K-4) having a specific gravity of 1.77.

EXAMPLE 1

A monomer mixture was prepared from 30 parts by weight of trimethylolpropane trimethacrylate, 70 parts by weight of styrene, and 0.5 part by weight of silane coupling agent ("KBM-503" made by Shinetsu Chemical Co., Ltd.). The monomer mixture was incorporated with 300 parts by weight aluminum hydroxide ("Hydilite H-302" having an average particle diameter of 3.5 μm, made by Showa Light Metal Co., Ltd.) using a high-speed mixer. The mixture was further incorporated with 0.8 part by weight of curing agent, bis(t-butylcyclohexyl)peroxy dicarbonate, ("Parcadox PX-16" made by Nippon Kayaku Co., Ltd.). After degassing under reduced pressure, there was obtained the mixture (I) for the matrix.

This mixture (I) had a viscosity of 10 poise at 30° C. and a specific gravity of 1.76. The cured product of this mixture (I) had a light transmittance of 82% measured for a 0.3 mm thick specimen.

Then, 100 parts by weight of this mixture (I) was mixed with 10 parts by weight of the chips (K-1) obtained in Manufacturing Example 1, 20 parts by weight of the chips (K-2) obtained in Manufacturing Example 2, and 30 parts by weight of the chips (K-3) obtained in Manufacturing Example 3. After degassing, the mixture was poured into a casting mold measuring 1000×2000×13 mm, followed by curing with heating at 60° C. for 42 minutes and post-curing at 120° C. for 2 hours.

The resulting cured product was a molded article composed of a cured resin matrix giving the beautiful appearance of white-milky marble and white and black chips, each having different clarity, uniformly dispersed in the matrix. The molded article gave the beautiful appearance of granite. The molded article (board) was finished by grinding the surface layer (about 0.5 mm thick) using a belt sander. There was obtained a board of artificial stone which shows three-dimensional patterns owing to the visible cross-section of the chips. Table 1 shows the physical properties of the board of this artificial stone.

EXAMPLE 2

A monomer mixture was prepared from 30 parts by weight of trimethylolpropane trimethacrylate, 50 parts by weight of styrene, 20 parts by weight of polystyrene, and 0.5 part by weight of silane coupling agent ("KBM-503" made by Shinetsu Chemical Co., Ltd.). The monomer mixture was incorporated with 250 parts by weight aluminum hydroxide ("Hydilite H-320" having an average particle diameter of 3.5 μm, made by Showa Light Metal Co., Ltd.) using a high-speed mixer. The mixture was further incorporated with 0.8 part by weight of curing agent, bus(t-butylcyclohexyl)peroxy dicarbonate, ("Parcadox PX-16" made by Nippon Kayaku Co., Ltd.). After mixing by a kneader, there was obtained the dough-like mixture (I) for the matrix.

The cured product of this mixture (I) had a light transmittance of 75% measured for a 0.3 mm thick pressmolded specimen.

Then, 100 parts by weight of this dough-like mixture (I) was mixed with 40 parts by weight of the chips (K-1) obtained in Manufacturing Example 1, and 25 parts by weight of the chips (K-3) obtained in Manufacturing Example 3. The mixture was mixed using a kneader to give the dough-like molding mixture (III) containing chips. The mixture (III) was pressed by a flat mold heated at 120° C. for 5 minutes, said mold having a cavity measuring 300×300×6 mm.

After demolding, there was obtained a board of granite-like artificial stone in which black and white chips are uniformly dispersed. Table 1 shows the physical properties of the board of this artificial stone.

Comparative Example 1

The same procedure as in Example 1 was repeated to give a board of artificial stone, except that the chips (K-1) and (K-2) were replaced by 30 parts by weight of the chips (K-4) obtained in Manufacturing Example 4. The board of this artificial stone gave the beautiful appearance of granite, but it was poor in physical properties as shown in Table 1.

TABLE 1

| Properties | Example 1 | Example 2 | Comparative Example 1 |
|---|---|---|---|
| Boiling resistance[1] | unchanged | unchanged | whitened, |

TABLE 1-continued

| Properties | Example 1 | Example 2 | Comparative Example 1 |
|---|---|---|---|
| | | | opaqued |
| Stain resistance[2] | | | |
| Lipstick | 10 | 9 | 5 |
| Marking ink | 9 | 9 | 3 |
| Live cigarette test[3] | 10 | 8 | 2 |
| Heat resistance[4] | 10 | 9 | 2 |

Note to Table 1
[1] The board specimen measuring 50 × 50 × 6 mm was immersed in boiling water for 500 hours, and the board surface was examined for any change.
[2] The specimen was stained with lipstick or marking ink and allowed to stand at 20° C. for 24 hours. The specimen was washed with a detergent ("Mamaroyal" made by Lion Co., Ltd.) and rinsed. The specimen surface was visually examined for any change.
[3] The specimen was allowed to stand for 5 minutes, with a live cigarette placed thereon. The specimen surface was visually examined for any change.
[4] The specimen was allowed to stand for 30 minutes, with a hot iron (200° C.) placed thereon. The specimen surface was visually examined for any change. The results of inspection are indicated in ten ranks: rank 10 for no change and rank 1 for marked change.

EXAMPLE 3

A monomer mixture was prepared from 10 parts by weight of trimethylolpropane trimethacrylate and 40 parts by weight of styrene. In this monomer mixture was dissolved 25 parts by weight of polystyrene ("S-bright T-2 beads" made by Showa Denko Co., Ltd.). The resulting solution was uniformly incorporated with 21 parts by weight of bisphenol-A epoxy resin ("Araldite GY-250" (with epoxy equivalent of 185) made by Ciba-Geigy Corp.) and 4 parts by weight of maleic anhydride. The mixture was further incorporated with 200 parts by weight of aluminum hydroxide ("Hydilite H-320" having an average particle diameter of 3.5 μm, made by Showa Light Metal Co., Ltd.). Thus there was obtained the mixture (I) for matrix.

This mixture (I) had a specific gravity of 1.71. The cured product of this mixture (I) had a light transmittance of 68% measured for a 0.3 mm thick specimen.

Then, 100 parts by weight of this mixture (I) was mixed with 10 parts by weight of the chips (K-1) obtained in Manufacturing Example 1, 20 parts by weight of the chips (K-2) obtained in Manufacturing Example 2, 30 parts by weight of the chips (K-3) obtained in Manufacturing Example 3, and 1 part by weight of radical polymerization initiator having a 10-hour half-life temperature of 74° C. ("Kayaester 0", made by Kayaku Noury Co., Ltd.). Thus there was obtained the mixture for casting.

The mixture was poured into an FRP mold for washbowl, measuring 750 mm wide, 550 mm long, and 130 mm deep, which had previously been heated to 60° C. and treated with a mold release. The mold was kept in an air bath at 65° C. to bring about the radical polymerization reaction. After 60 minutes, the mixture cured to such an extent as to be demolded. At his stage, the molded washbowl was demolded and post-cured in an air bath at 160° C. for 4 hours, with the periphery of the washbowl supported by a supporter, so that the epoxy resin cured completely. The resulting cured product was a molded article giving the beautiful appearance of granite which was composed of a cured resin matrix giving the beautiful appearance of milky-white translucent marble and white and black chips, each having different clarity, uniformly dispersed in the matrix. Table 2 shows the physical properties of the board of this artificial stone.

EXAMPLE 4

In a flask equipped with a stirrer, inert gas inlet tube, reflux condenser, and thermometer was placed 400 parts by weight of deionized water containing 0.2 parts by weight of polyvinyl alcohol. To the flask was added a mixture composed of 196 parts by weight of styrene, 4 parts by weight of isopropenyl oxazoline, and 16 parts by weight of benzoyl peroxide. The mixture was stirred at a high speed to give a uniform suspension. The mixture was heated at 80° C. for 5 hours, with stirring and bubbling of nitrogen gas, for the polymerization reaction. After cooling, the polymer suspension was filtered, followed by washing and drying. Thus there was obtained a thermoplastic resin (referred to as polymer (1) hereinafter) having the oxazoline group as the reactive group. This polymer (1) had a molecular weight (Mn) of 5800 measured by GPC.

Ten parts by weight of the polymer (1) was dissolved in a mixture of radical-polymerizable monomers composed of 25 parts by weight of styrene, 20 parts by weight of methyl methacrylate, and 10 parts by weight of trimethylolpropane triacrylate. The solution was uniformly incorporated with 23 parts by weight of bisphenol-A epoxy resin ("Araldite GY-250∞ having an epoxy equivalent of 185, made by Ciba-Geigy Corp.) and 12 parts by weight of maleic anhydride. The mixture was further incorporated with 150 parts by weight of aluminum hydroxide ("Hydilite H-320" made by Showa Light Metal Co., Ltd.). Thus there was obtained the mixture (I) for matrix.

This mixture (I) had a specific gravity of 1.68. The cured product of this mixture (I) had a light transmittance of 72% measured for a 0.3 mm thick specimen.

Then, 100 parts by weight of this mixture (I) for matrix was mixed with 80 parts by weight of the chips (K-1) obtained in Manufacturing Example 1, 20 parts by weight of the chips (K-2) obtained in Manufacturing Example 2, 30 parts by weight of the chips (K-3) obtained in Manufacturing Example 3, and the same radical polymerization initiator as used in Example 1. The mixture was cast and cured in the same manner as in Example 1. There was obtained a molded article giving the beautiful appearance of granite which was composed of a cured resin matrix giving the beautiful appearance of milky-white translucent marble and white and black chips, each having different clarity, uniformly dispersed in the matrix. Table 2 shows the physical properties of the board of this artificial stone.

Comparative Example 2

A mixture was prepared from 30 parts by weight of trimethylolpropane trimethacrylate, 70 parts by weight of styrene, and 300 parts by weight of aluminum hydroxide ("Hydilite H-320" having an average particle diameter of 3.5 μm, made by Showa Light Metal Co., Ltd.), using a high-speed mixer. To the mixture was added 0.8 part by weight of radical polymerization initiator, bis(t-butylcyclohexyl)peroxy dicarbonate, ("Parcadox PX-16" made by Nippon Kayaku Co., Ltd.). Then, 100 parts by weight of this mixture was mixed with 60 parts by weight of the chips (K-4) obtained in Manufacturing Example 4. The mixture was cast into a washbowl in the same manner as in Example 1. The molded item broke in the mold before demolding on account of excessive molding shrinkage. The molded item gave the appearance of white stone. It had poor physical properties as shown in Table 2.

TABLE 2

| Properties | Example 3 | Example 4 | Comparative Example 2 |
| --- | --- | --- | --- |
| Boiling resistance[1] | unchanged | unchanged | whitened, opaqued |
| Stain resistance[2] | | | |
| Lipstick | 10 | 10 | 4 |
| Marking ink | 9 | 9 | 3 |
| Live cigarette test[3] | 9 | 9 | 1 |
| Heat resistance[4] | 10 | 10 | 1 |

Note to Table 2
[1] The board specimen measuring 50 × 50 × 6 mm was immersed in boiling water for 500 hours, and the board surface was examined for any change.
[2] The specimen was stained with lipstick or marking ink and allowed to stand at 20° C. for 24 hours. The specimen was washed with a detergent ("Mamaroyal" made by Lion Co., Ltd.) and rinsed. The specimen surface was visually examined for any change.
[3] The specimen as allowed to stand for 5 minutes, with a live cigarette placed thereon. The specimen surface was visually examined for any change.
[4] The specimen was allowed to stand for 30 minutes, with a hot iron (200° C.) placed thereon. The specimen surface was visually examined for any change. The results of inspection are indicated in ten ranks: rank 10 for no change and rank 1 for marked change.

What is claimed is:

1. Granite-like artificial stone which consists essentially of a matrix and chips dispersed therein, said matrix being a cured product wherein the matrix has a light transmittance higher than 60% measured for a 0.3 mm thick specimen of a mixture (I) composed essentially of radical-polymerizable monomers containing at least 20 wt.% of a polyfunctional (meth)acrylate and an aromatic vinyl compound and at least 100 parts by weight for 100 parts by weight of said monomers of an inorganic filler powder, and said chips being a crushed cured product wherein the chips pass through the ASTM standard sieve of 10 mesh and do not pass through the ASTM standard sieve of 100 mesh and have a light transmittance higher than 2% but lower that of the matrix measured for 0.3 mm thick specimen of a mixture (II) composed essentially of radical-polymerizable monomers containing at least 20 wt.% of a polyfunctional (meth)acrylate which is the same as or different from that mentioned above and an aromatic vinyl compound which is the same as or different from that mentioned above and at least 100 parts by wight for 100 parts by weight of said monomers of an inorganic filler powder which is the same as or different from that mentioned above, and giving a different clarity and/or color tone from the cured product of said mixture (I).

2. Artificial stone as claimed in claim 1, wherein the radical-polymerizable monomers further contain a monofunctional (meth)acrylate ester.

3. Artificial stone as claimed in claim 1, wherein the mixture (I) further contains a thermoplastic resin which is soluble or dispersible in said radical-polymerizable monomers.

4. Artificial stone as claimed in claim 1, wherein the mixture (I) further contains a thermoplastic resin, epoxy resin, and polyfunctional carboxylic acid (and/or anhydride thereof) soluble or dispersible in said radical-polymerizable monomers.

5. Artificial stone as claimed in claim 3 or 4, wherein the thermoplastic resin is one which has a reactive functional group.

6. Artificial stone as claimed in claim 1, wherein the mixture (I) is composed of 100 parts by weight of said radical-polymerizable monomers and 100–800 parts by weight of inorganic filler powder.

7. Artificial stone as claimed in claim 4, wherein the mixture (I) is composed of 100 parts by weight of said radical-polymerizable monomers, 100–800 parts by weight of inorganic filler powder, 5–75 parts by weight of thermoplastic resin, 10–100 parts by weight of epoxy resin, and polyfunctional carboxylic acid (and/or anhydride thereof) in an amount of 0.5–4.0 equivalents (regarding the acid anhydride group to be difunctional) for 1 equivalent of epoxy resin.

8. Artificial stone as claimed in claim 1, wherein the cured product of the mixture (I) and the cured product of the mixture (II) have the values of specific gravity whose difference is smaller than ±0.1.

9. Artificial stone as claimed in claim 1, which comprises 100 parts by weight matrix and 40–150 parts of chips dispersed therein.

10. Artificial stone as claimed in claim 1, wherein the chips are those which are obtained by crushing two or more kinds of cured products which differ in clarity and/or color tone.

11. Artificial stone as claimed in claim 1, wherein the inorganic filler powder is aluminum hydroxide.

12. Artificial stone as claimed in claim 1, wherein the chips are those which are colored with a coloring agent.

* * * * *